United States Patent [19]
Vakavtchiev

[11] Patent Number: 5,646,457
[45] Date of Patent: Jul. 8, 1997

[54] NEUTRAL SAFETY SWITCH CONTROL DEVICE USING A ROTATABLE MAGNET FOR CONTROLLING REMOTE VEHICLE STARTING OF A VEHICLE EQUIPPED WITH A MANUAL TRANSMISSION

[76] Inventor: Violin S. Vakavtchiev, 765 Mountain Ave., #230, Springfield, N.J. 07081

[21] Appl. No.: 603,234

[22] Filed: Feb. 20, 1996

[51] Int. Cl.$^6$ .................................................. F02N 17/00
[52] U.S. Cl. ................... 307/10.6; 123/179.2; 290/38 C; 340/456
[58] Field of Search ..................... 307/9.1–10.6, 307/119; 290/37 R, 38 C, 38 R; 200/61.88, 61.28; 123/179.2–179.4; 335/205–207; 340/825.69, 825.72, 425.5, 456

[56] References Cited

U.S. PATENT DOCUMENTS

| | | | |
|---|---|---|---|
| 3,646,515 | 2/1972 | Vodehnal | 307/10.3 |
| 4,291,653 | 9/1981 | Tucker | 123/179.2 |
| 4,371,051 | 2/1983 | Achterholt | 307/10.6 |
| 4,392,059 | 7/1983 | Nespor | 290/38 C |
| 4,554,422 | 11/1985 | Embrey et al. | 200/61.88 |
| 5,024,186 | 6/1991 | Long et al. | 307/10.6 |
| 5,188,069 | 2/1993 | Fiorenza, II | 307/10.4 |
| 5,252,861 | 10/1993 | Steeby et al. | 307/10.6 |

*Primary Examiner*—Richard T. Elms
*Attorney, Agent, or Firm*—Ezra Sutton

[57] ABSTRACT

A control device is provided for controlling a magnetic switch connected to a remote start control module for remotely starting the engine of a vehicle having a manual transmission. The control device includes a rotational device rotatably mounted adjacent to the magnetic switch and includes a line for rotating the rotational device relative to the magnetic switch. The line is attached to a gear shift of the manual transmission and rotates the rotational device to a closing position for closing the magnetic switch. The rotational device includes an upper disc having a plurality of cavities for receiving a magnet at the closing position to close the magnetic switch and to make an electrical connection with the remote start control module for remotely starting the engine of a vehicle with a manual transmission.

10 Claims, 5 Drawing Sheets

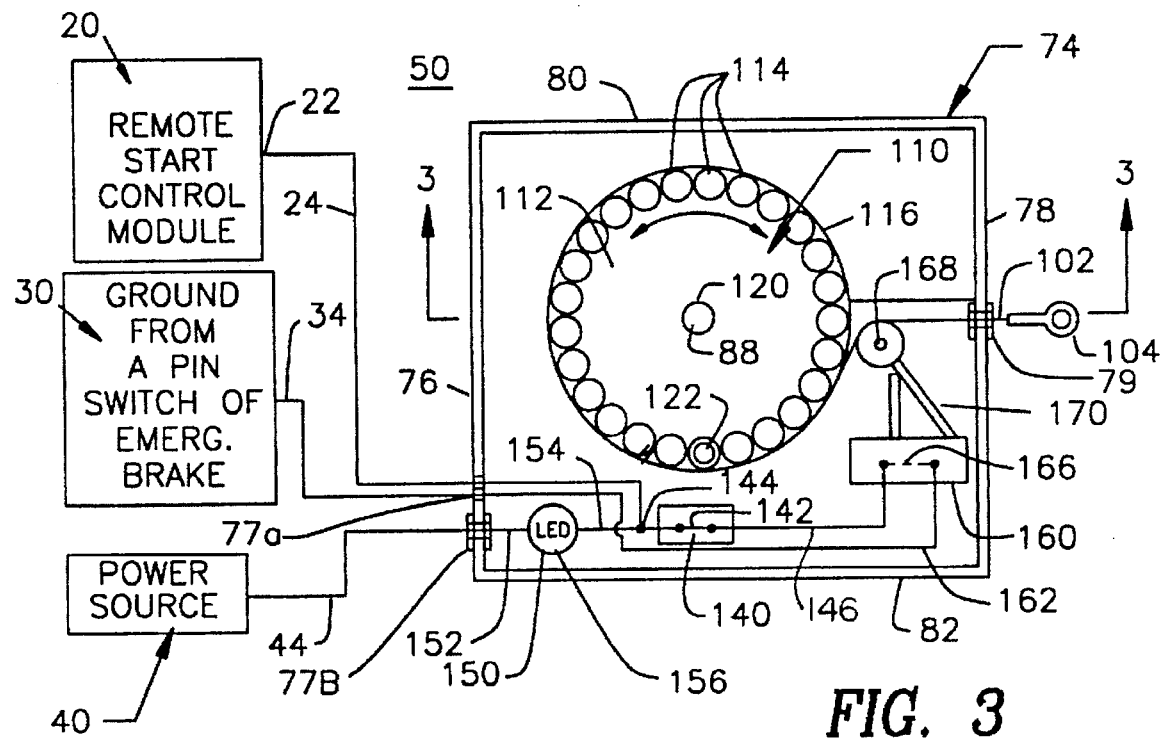
FIG. 3
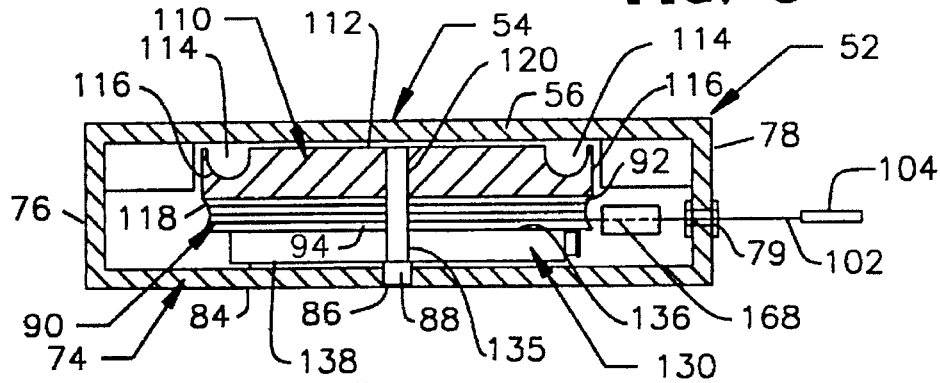
FIG. 4
FIG. 5

NEUTRAL SAFETY SWITCH CONTROL DEVICE USING A ROTATABLE MAGNET FOR CONTROLLING REMOTE VEHICLE STARTING OF A VEHICLE EQUIPPED WITH A MANUAL TRANSMISSION

FIELD OF THE INVENTION

This invention relates to a neutral safety-switch control device, and more particularly, the neutral safety-switch control device is used for a remote controlled engine start-up on a vehicle having a manual transmission.

BACKGROUND OF THE INVENTION

Remote vehicle starter devices for automatic, semi-automatic or manual clutch transmissions having electronic components are the current standard for the motor vehicle industry. Most remote vehicle starter devices work well for automatic transmissions but they should not be used for remote starting of manual transmissions, since it may cause a serious accident if the vehicle is remotely started while the manual transmission is in gear.

There remains a need for a neutral safety switch control device which is used for remotely starting an engine of a motor vehicle having a manual transmission that is easily installed, safe to use and reliable.

DESCRIPTION OF THE PRIOR ART

Remote controlled engine start-up devices for automatic and manual transmission vehicles having various designs have been disclosed in the prior art. For example, U.S. Pat. Nos. 5,188,069 and 5,252,861 disclose electronic safety interlock devices for automatic or manual transmission vehicles. These prior art patents do not disclose a memory distance feature incorporated therein to provide a neutral safety control device as in the present invention.

Further, none of the prior art patents disclose the combination of a remote start-up control module and a neutral safety control device having a magnetic switch and a mechanical memory distance component for the remote start-up of a manual transmission vehicle in a safe, easy, and reliable manner. In addition, none of the prior art patents disclose or teach the distinctive features of the present invention of a neutral safety switch control device having means for correlating the distance measurement of when a gear shift of a manual transmission vehicle is in a neutral position which determines whether the remote engine start-up of this vehicle is to be enabled.

Accordingly, it is an object of the present invention to provide a neutral safety-switch control device to be used in combination with a remote start-up control module for the remote start-up of a motor vehicle engine having a manual transmission.

Another object of the present invention is to provide a neutral safety-switch control device for manual transmission vehicles wherein this neutral safety-switch control device memorizes the neutral position of the gear shift in order to prevent the unsafe condition of a remote start-up of the vehicle engine when the gear shift is an engaged position other than neutral.

Another object of the present invention is to provide a neutral safety-switch control device that uses a magnetic component to memorize the neutral position of the manual transmission gear shift for a safe and reliable remote start-up of the vehicle engine.

Another object of the present invention is to provide a neutral safety-switch control device that is easily installed with a minimum amount of labor, cost and time.

A further object of the present invention is to provide a neutral safety-switch control device that can be mass produced in an automated and economical manner and is readily affordable by the user.

SUMMARY OF THE INVENTION

In accordance with the present invention, there is provided a control device for controlling a magnetic switch connected to a remote start control module for remotely starting the engine of a vehicle having a manual transmission. A rotational device is rotatably mounted adjacent to the magnetic switch and includes a series of detachably connected discs being an upper, center and lower disc for determining a physical distance and having means for memorizing a physical distance. In addition, the control device has means for rotating the rotational device relative to the magnetic switch. The means for rotating includes a line or cord which is permanently attached to the center disc, and the line can be formed of flexible metal material, plastic, or fabric material. The line is attached to a gear shift of the manual transmission and rotates the rotational device to a closing position for closing the magnetic switch. The upper disc has a plurality of cavities for receiving a magnet at the closing position to close the magnetic switch and to make an electrical connection with the remote start control module for remotely starting the engine of a vehicle with a manual transmission.

BRIEF DESCRIPTION OF THE DRAWINGS

Further objects, features, and advantages of the present invention will become apparent upon consideration of the detailed description of the presently-preferred embodiments, when taken in conjunction with the accompanying drawings wherein:

FIG. 3 is a top plan view and schematic of the present invention showing the relationship of the neutral safety-switch control device and a remote start-up control module, a power source, and a ground point;

FIG. 4 is a side cross-sectional view taken along lines 4—4 of FIG. 3 of the present invention showing the neutral safety-switch control device and its component parts;

FIG. 5 is a schematic diagram of the present invention showing the relationship of the neutral safety-switch control device to the gear shift and to the remote start-up control module, ground and power source;

DETAILED DESCRIPTION OF THE PREFERRED EMBODIMENT OVERVIEW

Figure 1:
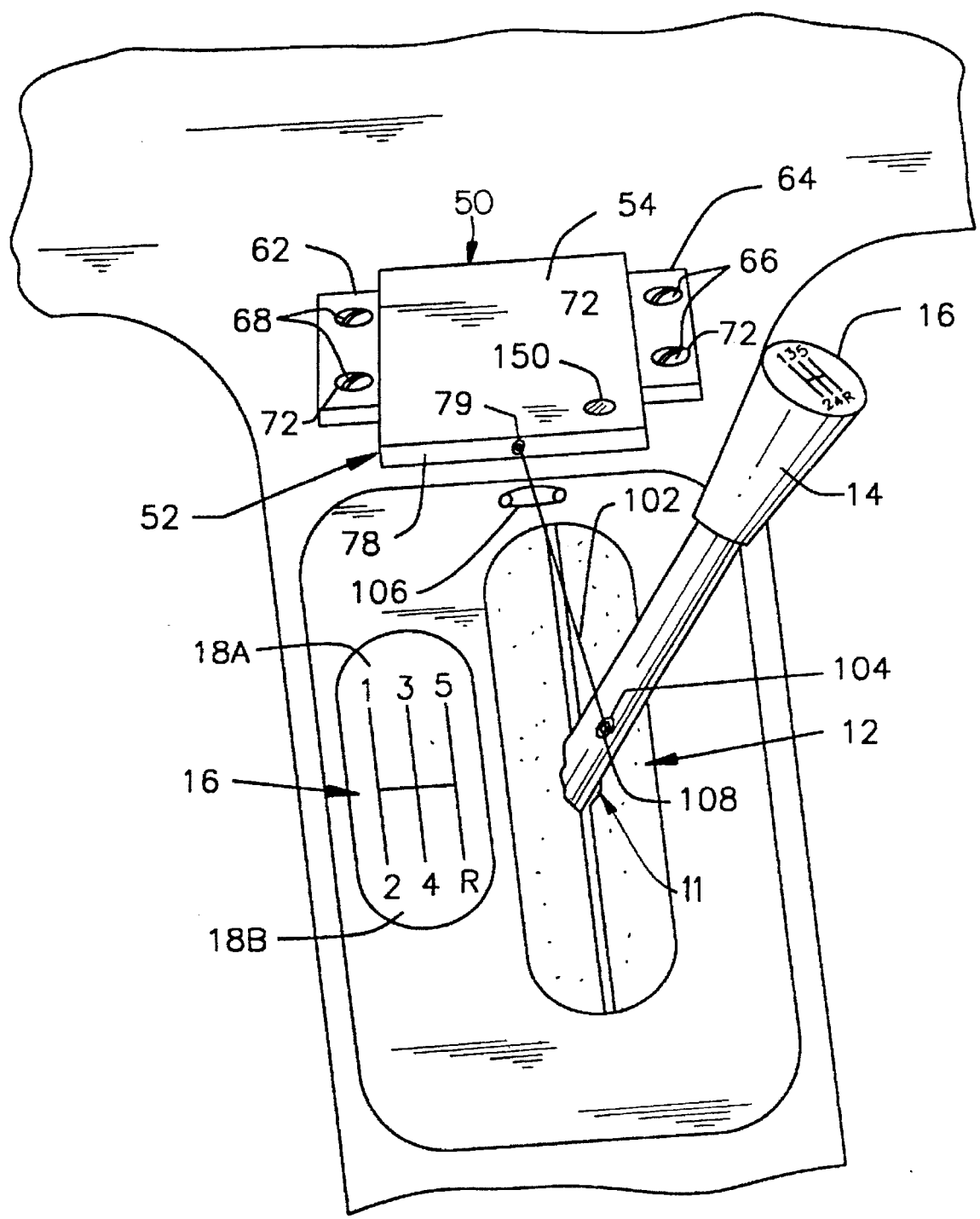
FIG. 1 is a perspective view of the present invention showing the neutral safety-switch control device attached to a manual transmission gear shift.
Figure 2:
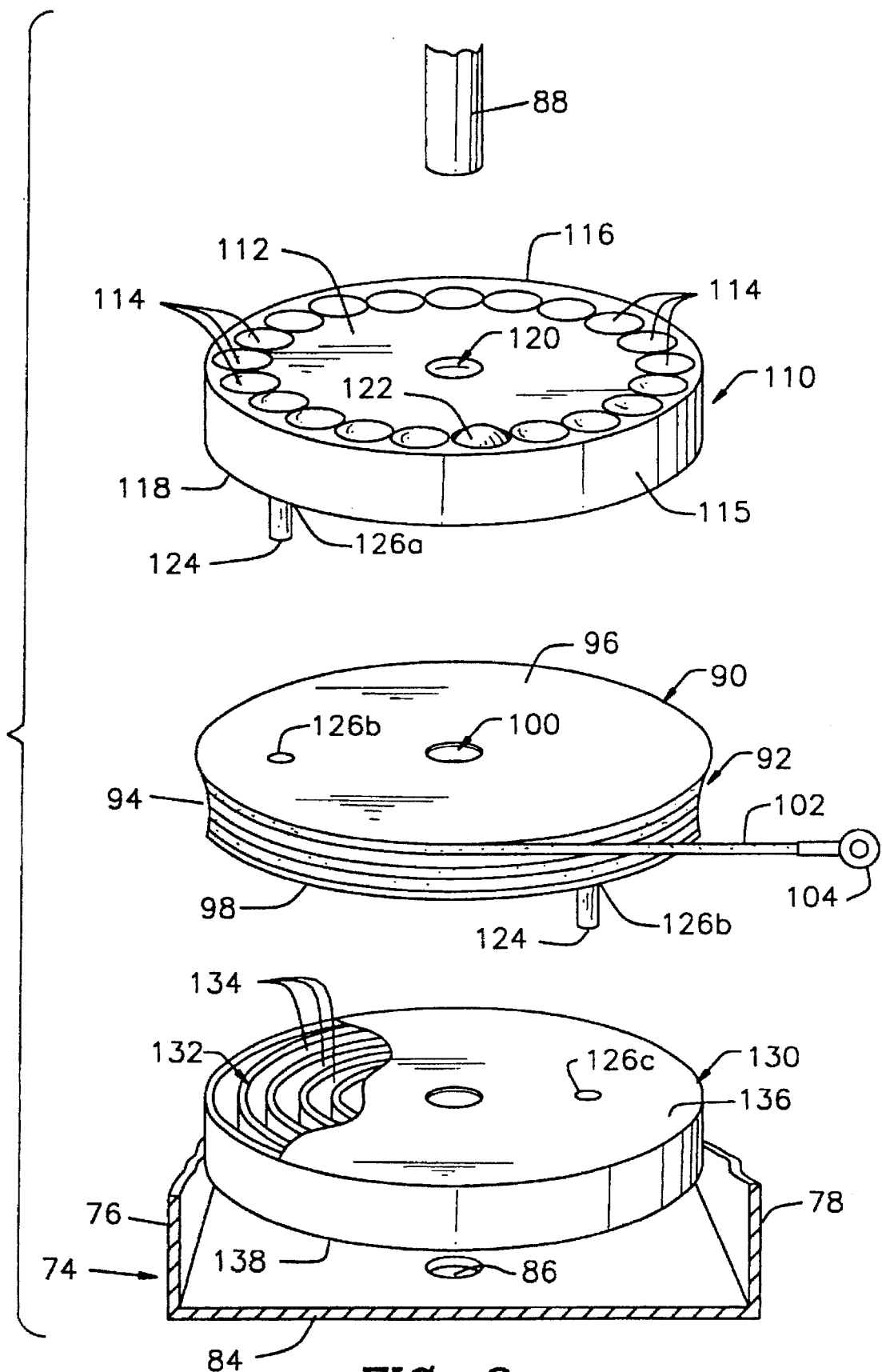
FIG. 2 is an exploded perspective view of the present invention showing the neutral safety-switch control device and its component parts contained within the holding compartment of the safety-switch housing.
Figure 6:
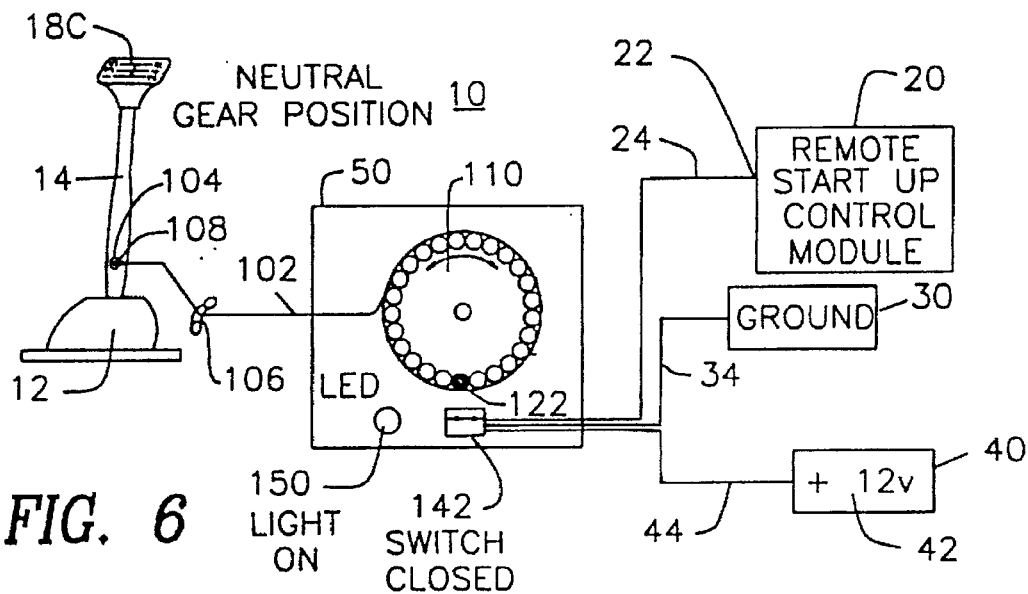
FIG. 6 is a schematic diagram of the present invention in operation showing the neutral safety-switch control device being in a neutral gear shift position.
Figure 7:
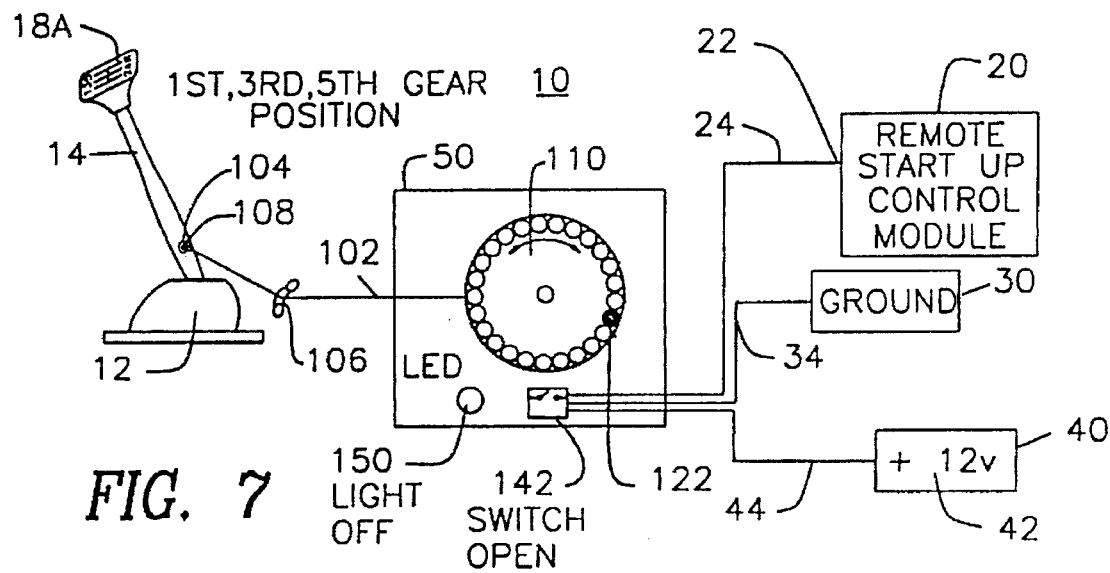
FIG. 7 is a schematic diagram of the present invention in operation showing the neutral safety-switch control device in the first, third, or fifth gear shaft positions.
Figure 8:
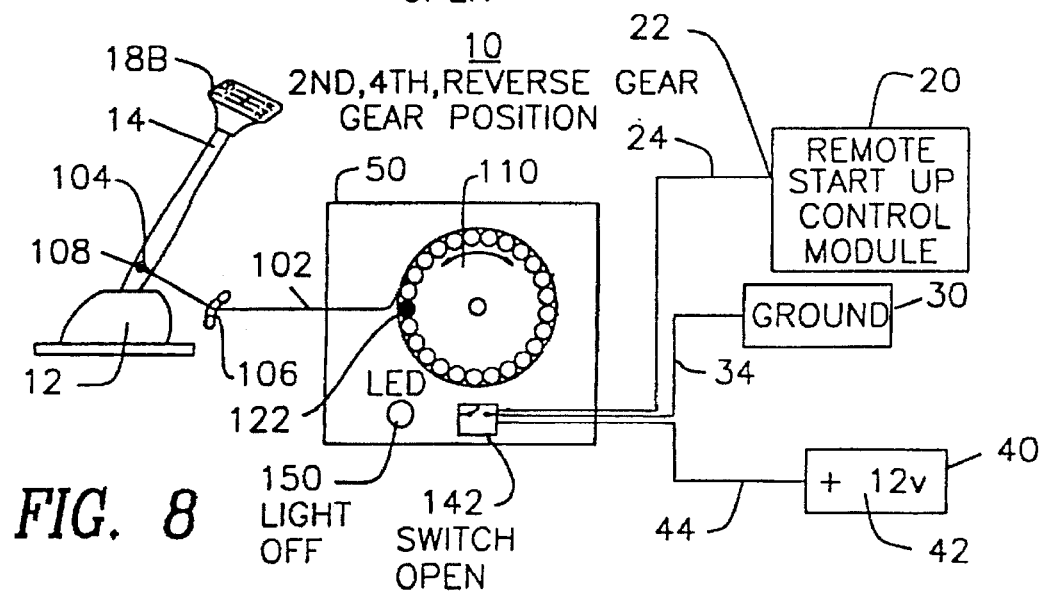
FIG. 8 is a schematic diagram of the present invention in operation showing the neutral safety-switch control device in the second, fourth, or reverse gear shift positions.
Figure 9:
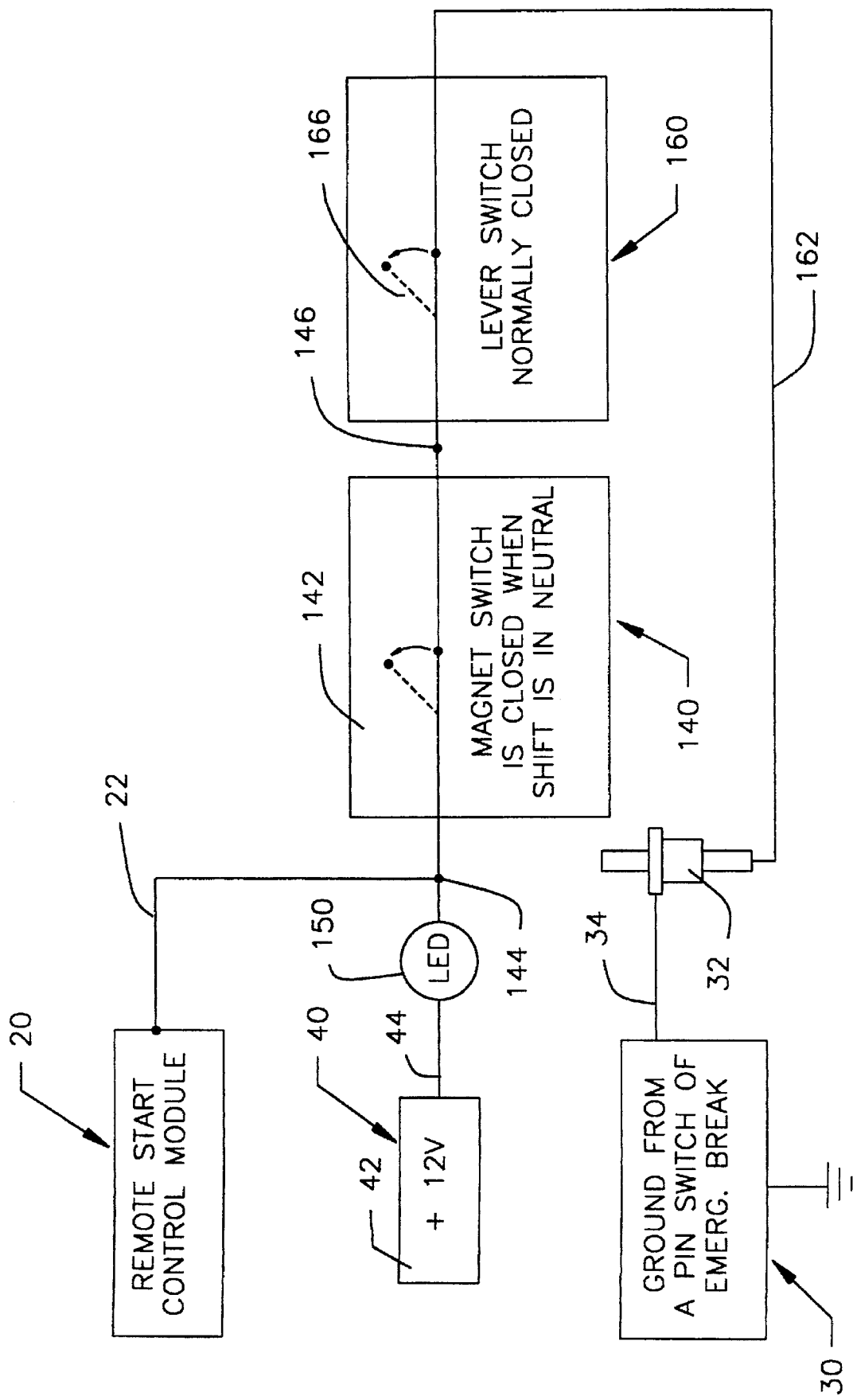
FIG. 9 is an electrical schematic diagram of the present invention showing the electrical connections for the remote controlled engine start-up system having a remote control module, a ground point, a power source, and a neutral safety switch control device.

The preferred embodiment of the present invention provides for a neutral safety switch control device 50, used for a remote controlled engine start-up on a motor vehicle having a manual transmission 12, as represented by FIGS. 1 through 8. FIG. 1 shows the neutral safety switch control device 50 properly mounted in the shifting area 11 of a manual transmission 12 having a gear shift 14. FIGS. 2, 3, and 4 show the neutral safety switch control device 50 and its various component parts contained therein. FIG. 5 shows a remote controlled engine start-up system 10 having a remote start-up control module 20, a ground point 30, a power source 40, and a neutral safety switch control device 50 used for the remote start-up of a gasoline engine having a gear shift 14 for a manual transmission 12. FIGS. 6, 7, and 8 show the neutral safety switch control device 50 in various operational modes. FIG. 9 shows the electrical diagram of the remote controlled engine start-up system.

Remote start-up control module 20 has an electrical connection point 22 and is electrically connected to the neutral safety switch 50 via electrical line 24. The remote start-up control module 20 is a standard manufactured electronic device used for engine start-up of motor vehicles having an automatic transmission. The ground point 30 for the remote controlled engine start-up system 10 uses the pin switch of the emergency brake 32 and is electrically connected to the neutral safety switch 50 via electrical line 34. The power source 40 for the remote controlled engine start-up system 10 uses a 12+ volt battery 42 and is electrically connected to the neutral safety switch 50 via electrical line 44. The neutral safety switch control device 50 includes a housing 52 having a molded front cover plate 54 and a holding compartment 74 for holding therein the various component parts of the neutral safety-switch 50.

NEUTRAL SAFETY SWITCH CONTROL DEVICE 50

The neutral safety switch control device 50 includes a housing 52, as shown in FIGS. 1 to 4, having a molded front cover plate 54 and a holding compartment 74. Both components are substantially rectangular in shape and are made either of a stamped metal, such as aluminum or tin, or are made of a durable, moldable plastic. Front cover plate 54 includes a front wall 56 and a pair of sidewalls 58 and 60 with integrally attached side flanges 62 and 64 having attachment openings 66 and 68 for attaching the cover plate 54 to the shifting area 11 via metal screws 72. Front wall 56 has a circular opening 70 for an LED light diode 156.

Holding compartment 74 includes sidewalls 76, 78, 80, and 82 and a bottom wall 84 having a centrally located circular shaft opening 86 with a shaft bearing 87 for shaft 88. Bottom wall 84 also includes a plurality of attachment openings 85 for attaching the compartment 74 to the shifting area 11 of manual transmission 12 via screws 72. Sidewall 76 includes electrical wire openings 77a and 77b for electrical lines 24, 34, and 44. Sidewall 78 includes a circular opening 79 for connecting means 102.

Shaft 88 holds in place an upper disk 110, a center disk 90, and a lower disk 130 which are used to memorize a special distance within the holding compartment 74 of housing 52. Upper and lower disks 110 and 130 are detachably connected to the center disk 90 by use of interlocking key pins 124 and key channel openings 126a, 126b, and 126c as depicted in FIG. 2 of the drawings. These disks 90, 110, and 130 are made of a light-weight metal, such as aluminum, or a durable moldable plastic.

Center disk 90 includes an outer perimeter edge 92 having a V-grooved indentation 94; and front and rear wall surfaces 96 and 98 having a shaft opening 100. In addition, center disk 90 has connected to it a permanently affixed connecting means 102 having at the other end an attachment ring 104 for attaching to the gear shift 14 via attachment bracket 106 by use of attachment bolt or screw 108. Connecting means 102 may be made of a durable metal wire, plastic filament, or textile cord.

Upper disk 110 includes a top wall surface 112 having formed therein a plurality of circular grooved indentations 114 for receiving and holding a circular magnet 122. Indentations 114 are formed in a circular arrangement and are adjacent to the outer perimeter edge 116, as shown in FIGS. 2 and 3 of the drawings.

Disk 110 also includes a bottom wall surface having a shaft opening 122 for shaft 88. In addition, the bottom wall 118 has an interlock channel opening 126a having key pin 124 for attaching to the top wall surface 96 of center disk 90 having a matching interlock channel opening 126b.

Lower disk 130 includes a hollow compartment 132 for containing a circular self-winding spring component 134. Disk also includes a top and bottom walls 136 and 138 having shaft openings 135 for shaft 88. In addition, the top wall 136 has an interlock channel opening 126c having a key pin 124 for attaching to the bottom wall 98 of center disk 90 having a matching interlock channel opening 126b. Spring component 134 is connected to center disk 90 and is used for keeping the connection means or line 102 in a taut position when the attachment ring 104 is affixed to gear shift 14.

Further, as shown in the electrical schematic diagram of FIG. 9, the neutral safety switch control device 50 has an electrical circuit within compartment 74 including a magnetic switch component 140 for determining when the manual transmission 12 has the gear shift 14 in the neutral position 18C; a LED light component 150 for showing a green light 156 when gear shift 14 is in the neutral position 18C; and a lever micro-switch 160 for sensing when connection means 102 has been severed, broken or disconnected from center disk 90, and opening the circuit to disable the system. Switch component 140 includes a switch lever 142 for closing the switch circuit with incoming and outgoing connection points 144 and 146. LED light component 150 includes a green LED light diode 156 with incoming and outgoing electrical lines 152 and 154 from the power source 40 and switch 140. Lever micro-switch 160 includes a switch lever 166 for opening the switch circuit when a problem occurs with line 102, incoming and outgoing electrical lines 162 and 164, and a lever pulley 168 with pulley strut 170 for keeping the connecting means or line 102 in a proper position in relationship to gear shift 14.

OPERATION OF THE PRESENT INVENTION

The neutral safety switch control device 50, as part of the remote controlled engine start-up system 10, is put into operational use by first installing the various components of system 10 within the motor vehicle by an installer. The remote start-up control module 20 is positioned underneath the motor vehicle's dashboard and is electrically connected to the neutral safety switch 50 via electrical line 24 from module's 20 connection point 22. The neutral safety switch control device 50 is then positioned at a proper location within the shifting area 11 of the motor vehicle, and the front cover plate 54 of housing 52 is removed. The holding compartment 74 is then fixedly attached to the shifting area 11 adjacent to gear shift 14 via screws 72 through attachment openings 85 of bottom wall 84. Electrical connections are then made from the neutral safety switch 50 to the 12+ volt battery 42 via electrical line 44, and to the ground point 30 which is the pin switch of emergency brake 32 via electrical line 34.

The installer then attaches the attachment bracket 106 to an appropriate location within the shifting area 11 between the gear shift 14 and sidewall 78 of holding compartment 74 for putting tension on the connecting means 102. The installer then attaches the connecting means 102 via bracket 106 to gear shift 14 by an attachment bolt 108 through attachment ring 104, as depicted by FIG. 1 of the drawings. The installer pre-taps a bolt opening 15 within gear shift 14 for the attaching of bolt 108 to gear shift 14.

The installer then puts the gear shift 14 in the neutral position 18C, as depicted in FIG. 6 of the patent drawings, based upon the gear shift schematic 16 of manual transmission 12. This aforementioned step sets the proper physical distance of connecting means 102 to gear shift 14 for the neutral position 18C. The installer then sets the circular magnet 122 within the south most position of one of the grooved indentations 114 which then closes magnetic switch lever 142 of switch component 140, as depicted in FIG. 3. This then lights-up the green LED light bulb 156 of LED component 150 showing that the gear shift 14 of manual transmission 12 is in the neutral position 18C, as depicted in FIG. 6.

The installer then places the front cover plate 54 on the holding compartment 74 and attaches flanges 62 and 64 via screws 72 to shift area 11. The neutral safety-switch control device 50 as part of the engine start-up system 10 is now ready for use by a driver of the installed system 10 of a motor vehicle.

The driver can now use the remote controlled engine start-up system 10 for his or her manual transmission motor vehicle. The driver uses the hand-held remote starter to start-up the engine of the motor vehicle which will only start if the gear shift 14 is in the neutral position 18C. The engine will not start if gear shift 14 in an engaged position, such as in positions 18A or 18B shown in FIGS. 7 and 8. The neutral safety-switch control device 50 is in an OFF position, when magnet 122 is not adjacent to magnetic switch 142 and LED light bulb 156 is also not ON. This provides the driver with a safety feature of not having the engine start, while the gear shift 14 is in engaged positions 18A and 18B of gear shift schematic 16.

ADVANTAGES OF THE PRESENT INVENTION

Accordingly, an advantage of the present invention is that it provides for a neutral safety-switch control device to be used in combination with a remote start-up control module for the remote start-up of a motor vehicle engine having a manual transmission.

Another advantage of the present invention is that it provides for a neutral safety-switch control device for manual transmission vehicles wherein this neutral safety-switch control device memorizes the neutral position of the gear shift in order to prevent the unsafe condition of a remote start-up of the vehicle engine when the gear shift is an engaged position other than neutral.

Another advantage of the present invention is that it provides for a neutral safety-switch control device that uses a magnetic component to memorize the neutral position of the manual transmission gear shift for a safe and reliable remote start-up of the vehicle engine.

Another advantage of the present invention is that it provides for a neutral safety-switch control device that is easily installed with a minimum amount of labor, cost, and time.

A further advantage of the present invention is that it provides for a neutral safety-switch control device that can be mass produced in an automated and economical manner and is readily affordable by the user.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A control device for controlling a magnetic switch connected to a remote start control module, comprising:

a) a remote start control module for remotely starting an engine of a vehicle having a manual transmission;

b) a magnetic switch electrically connected to said remote start control module;

c) rotational means rotatably mounted adjacent to said magnetic switch;

d) means for rotating said rotational means relative to said magnetic switch;

e) said means for rotating including means for attachment to a gear shift of said manual transmission and for rotating said rotational means to a closing position for closing said magnetic switch; and f) said rotational means including means for receiving a magnet at said closing position to close said magnetic switch to make an electrical connection with said remote start control module for remotely starting the engine of said vehicle with a manual transmission.

2. A control device in accordance with claim 1 wherein said rotational means includes a rotatable disc, and said means for rotating said rotatable disc includes a line wrapped around said rotatable disc, and said means for attachment to a gear shift includes a ring connected to said line for attachment to a gear shift.

3. A control device in accordance with claim 2, wherein said line is formed of flexible metal material.

4. A control device in accordance with claim 2, wherein said line is formed of plastic.

5. A control device in accordance with claim 2, wherein said line is formed of fabric material.

6. A control device in accordance with claim 1, wherein said means for receiving a magnet at said closing position includes a plurality of indentations in said rotational means, each of said indentations for receiving said magnet when at said closing position.

7. A control device in accordance with claim 1, further including a light for indicating when said magnet has closed said magnetic switch.

8. A control device in accordance with claim 1, further including a micro-switch for engaging said means for rotating and for signalling when said means for rotating is not operating properly.

9. A control device in accordance with claim 1, further including means for connecting said magnetic switch to a power source and to ground.

10. A control device in accordance with claim 1, further including a housing for receiving said rotational means, said housing including means for attachment to said vehicle adjacent to said gear shift.

* * * * *